United States Patent
Jeong et al.

(10) Patent No.: US 9,451,506 B2
(45) Date of Patent: Sep. 20, 2016

(54) METHOD AND APPARATUS FOR SUPPORTING MOBILITY OF UE IN LOCAL NETWORK

(71) Applicant: Samsung Electronics Co., Ltd., Gyeonggi-do (KR)

(72) Inventors: Sang Soo Jeong, Gyeonggi-do (KR); Song Yeon Cho, Seoul (KR); Beom Sik Bae, Gyeonggi-do (KR); Jung Je Son, Gyeonggi-do (KR); Han Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 14/348,578

(22) PCT Filed: Sep. 28, 2012

(86) PCT No.: PCT/KR2012/007947
§ 371 (c)(1),
(2) Date: Mar. 28, 2014

(87) PCT Pub. No.: WO2013/048201
PCT Pub. Date: Apr. 4, 2013

(65) Prior Publication Data
US 2014/0376512 A1    Dec. 25, 2014

(30) Foreign Application Priority Data
Sep. 30, 2011    (KR) .................. 10-2011-0099562

(51) Int. Cl.
*H04W 4/00* (2009.01)
*H04W 36/00* (2009.01)
(Continued)

(52) U.S. Cl.
CPC ......... *H04W 36/0016* (2013.01); *H04W 76/02* (2013.01); *H04W 76/06* (2013.01); *H04W 92/20* (2013.01)

(58) Field of Classification Search
CPC .......... H04W 36/0016; H04W 92/20; H04W 76/02; H04W 76/06
See application file for complete search history.

(56) References Cited

U.S. PATENT DOCUMENTS

| 2010/0112980 A1* | 5/2010 | Horn | H04W 48/20 455/411 |
| 2010/0112981 A1* | 5/2010 | Suh  | H04W 48/14 455/411 |

(Continued)

FOREIGN PATENT DOCUMENTS

| WO | WO 2010/119707 A1 | 10/2010 |
| WO | WO 2010/123643 A1 | 10/2010 |
| WO | WO 2011/095358 A1 | 8/2011  |

OTHER PUBLICATIONS

International Search Report dated Mar. 13, 2013 in connection with International Patent Application No. PCT/KR2012/007947, 3 pages.
(Continued)

*Primary Examiner* — Clemence Han (57) ABSTRACT

The present invention relates to a method and apparatus for managing a Local IP Access (LIP A) connection in a local network system. The method of managing a LIP A connection of UE in a connected state according to an embodiment of the present invention includes the steps of: a source home base station for UE determining a handover of the UE; when the handover of the UE is determined, determining whether a target home base station is a Long Term Evolution (LTE) release 10 or a Pre Rel-11 HeNB; and when the target home base station is a Pre Rel-11 HeNB, disconnecting the LIP A connection of the UE. According to an embodiment of the present invention, the mobility of UE having a LIPA PDN connection can be efficiently controlled in a local network where a Rel-11 H(e)NB and a Pre Rel-11 H(e)NB exist together.

16 Claims, 12 Drawing Sheets

(51) Int. Cl.
*H04W 76/02* (2009.01)
*H04W 76/06* (2009.01)
*H04W 92/20* (2009.01)

(56) References Cited

U.S. PATENT DOCUMENTS

| | | | |
|---|---|---|---|
| 2010/0234017 A1* | 9/2010 | Lim | H04L 12/2807 455/426.1 |
| 2011/0045834 A1* | 2/2011 | Kim | H04L 45/306 455/438 |
| 2011/0217978 A1* | 9/2011 | Horn | H04W 8/186 455/433 |
| 2011/0287743 A1* | 11/2011 | Hu | H04L 67/16 455/411 |
| 2012/0189016 A1* | 7/2012 | Bakker | H04W 76/021 370/401 |
| 2012/0257598 A1* | 10/2012 | Karampatsis | H04W 8/082 370/331 |
| 2012/0264443 A1* | 10/2012 | Ng | H04W 4/005 455/450 |
| 2012/0275401 A1* | 11/2012 | Sun | H04W 72/04 370/329 |
| 2012/0329478 A1* | 12/2012 | Lee | H04W 8/04 455/456.1 |
| 2013/0039244 A1* | 2/2013 | Sun | H04W 52/0235 370/311 |
| 2013/0203414 A1* | 8/2013 | Zong | H04W 60/00 455/435.1 |

OTHER PUBLICATIONS

Written Opinion of International Searching Authority dated Mar. 13, 2013 in connection with International Patent Application No. PCT/KR2012/007947, 3 pages.

3GPP TS 23 401 V10.4.0, 3RD Generation Partnership Project; Technical Specification Group Services and System Aspects; General Packet Radio Services (GPRS) Enhancements for Evolved Universal Terrestrial Radio Access Network (E-UTRAN) Access, (Release 10), 5.3.3 Tracking Area Updated Procedures, Jun. 2011, 281 pages.

* cited by examiner

METHOD AND APPARATUS FOR SUPPORTING MOBILITY OF UE IN LOCAL NETWORK

CROSS-REFERENCE TO RELATED APPLICATION(S)

The present application claims priority under 35 U.S.C. §365 to International Patent Application No. PCT/KR2012/007947 filed Sep. 28, 2012, entitled "METHOD AND APPARATUS FOR SUPPORTING MOBILITY OF UE IN LOCAL NETWORK". International Patent Application No. PCT/KR2012/007947 claims priority under 35 U.S.C. §365 and/or 35 U.S.C. §119(a) to Korean Patent Application No. 10-2011-0099562 filed Sep. 30, 2011 and which are incorporated herein by reference into the present disclosure as if fully set forth herein.

TECHNICAL FIELD

The present invention relates to an LIPA connection management method and apparatus in a local network system.

BACKGROUND ART

The Local IP Access (LIPA) of the conventional Residential Network is supported only in the situation where a Local Gateway (L-GW) is co-located with Home (evolved) Node B (hereinafter, H(e)NB).

Figure 1:
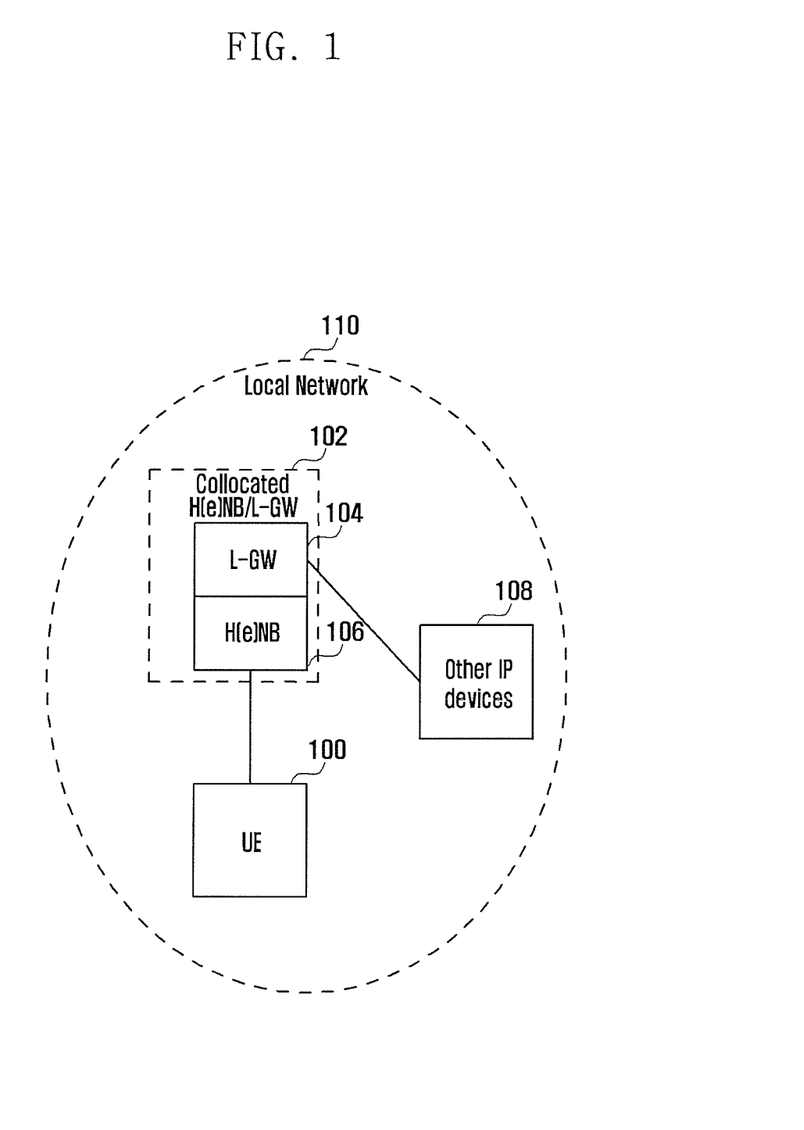
FIG. 1 is a diagram illustrating a structure of an LIPA-enabled network 110 which does not support Session Continuity

FIG. 1 is a diagram illustrating a structure of an LIPA-enabled network 110 which does not support Session Continuity. Referring to FIG. 1, the local network includes an H(e)NB 106 and L-GWs 104 responsible for gateway function which constitute one entity 102 logically. The H(e)NB 106 and L-GWs 104 communicate through internal interfaces. The UE 100 uses the H(e)NB to communicate with another IP device 108 present in the local network. At this time, the data packets of the user are transmitted to the other IP device 108 through the L-GW 104 in the location network. The local network based on the co-located L-GW 104 is advantageous in simple network structure. However, as described above, such a local network has a drawback of not supporting Session Continuity.

Figure 2:
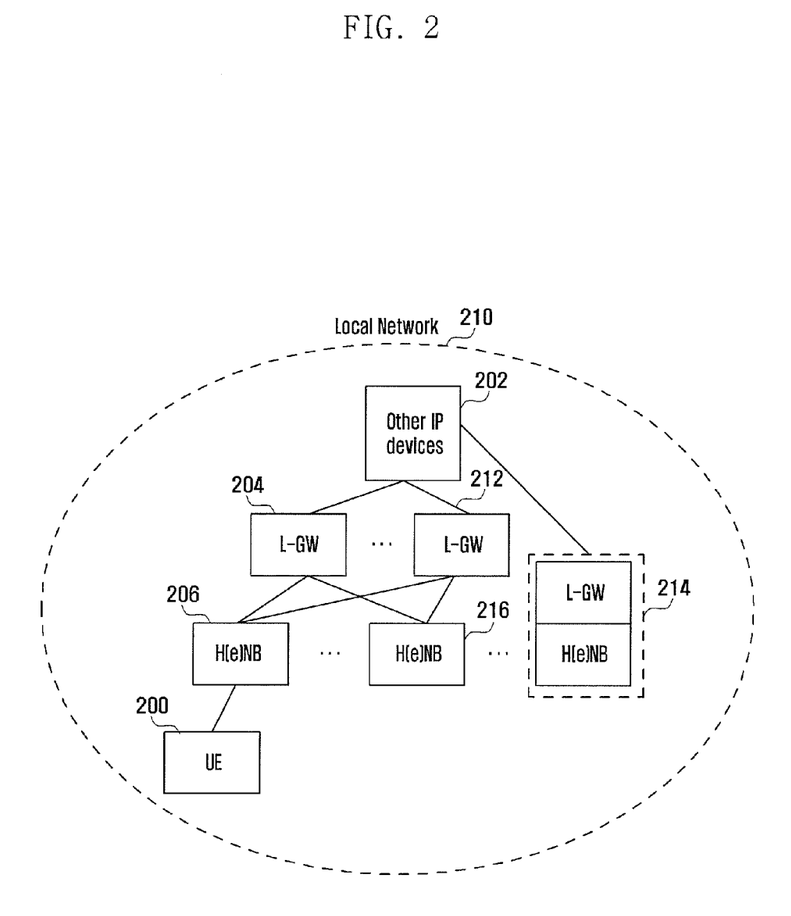
FIG. 2 is a diagram illustrating a configuration of LIPA Mobility and SIPTO at the Local Network (LIMONET).

FIG. 2 is a diagram illustrating a configuration of LIPA Mobility and SIPTO at the Local Network (LIMONET). In order to overcome the drawback of the network as shown in FIG. 1, LIMONET has been introduced as a concept in which the H(e)NB and L-GW are logically separated, i.e. in the form of stand-alone local network.

As shown in FIG. 2, the local network 210 may include a stand-along L-GW 204 in the LIMONET environment. At this time, a plurality of H(e)NBs 206 and 216 and L-GWs 204 and 212 may be installed and operate in one local network 210. Since the L-GW 204 and H(e)NB 206 are logically separated, the L-GW 204 has to maintain a connection with the H(e)NB 206 for providing the UE 200 or other IP devices 202 with the connection service. Meanwhile, the local network 210 may include an entity 214 co-located with the H(e)NB and L-GW as shown in FIG. 2.

Figure 3:
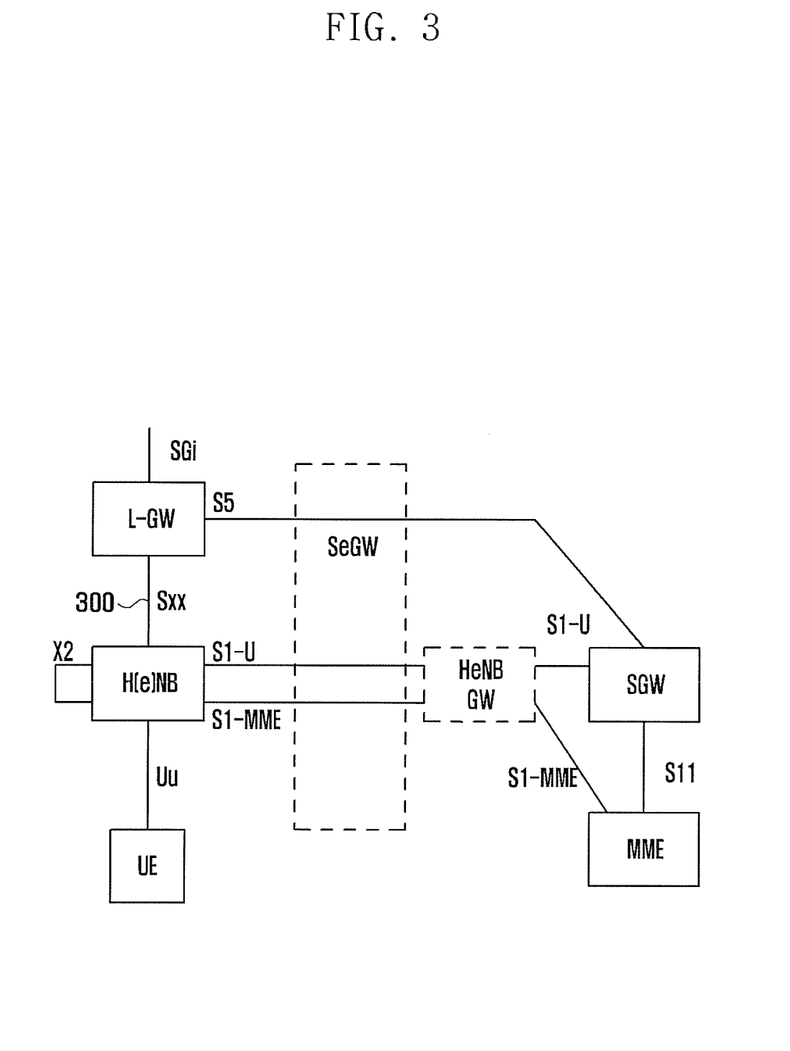
FIG. 3 is a diagram illustrating a network structure for supporting stand-along L-GW.

FIG. 3 is a diagram illustrating a network structure for supporting stand-along L-GW. As shown in FIG. 3, the L-GW and the H(e)NB are connected to each other. The connection interface between the L-GW and H(e)NB is referred to as Sxx interface 300.

Returning to FIG. 2, the structure in which the H(e)NB and L-GW are separated so as to support mobility (hereinafter, referred to as Rel-11 HeNB) and another structure in which the H(e)NB and L-GW are co-located so as not to support mobility (hereinafter, referred to as PRE Rel-11 HeNB) may coexist.

Figure 4:
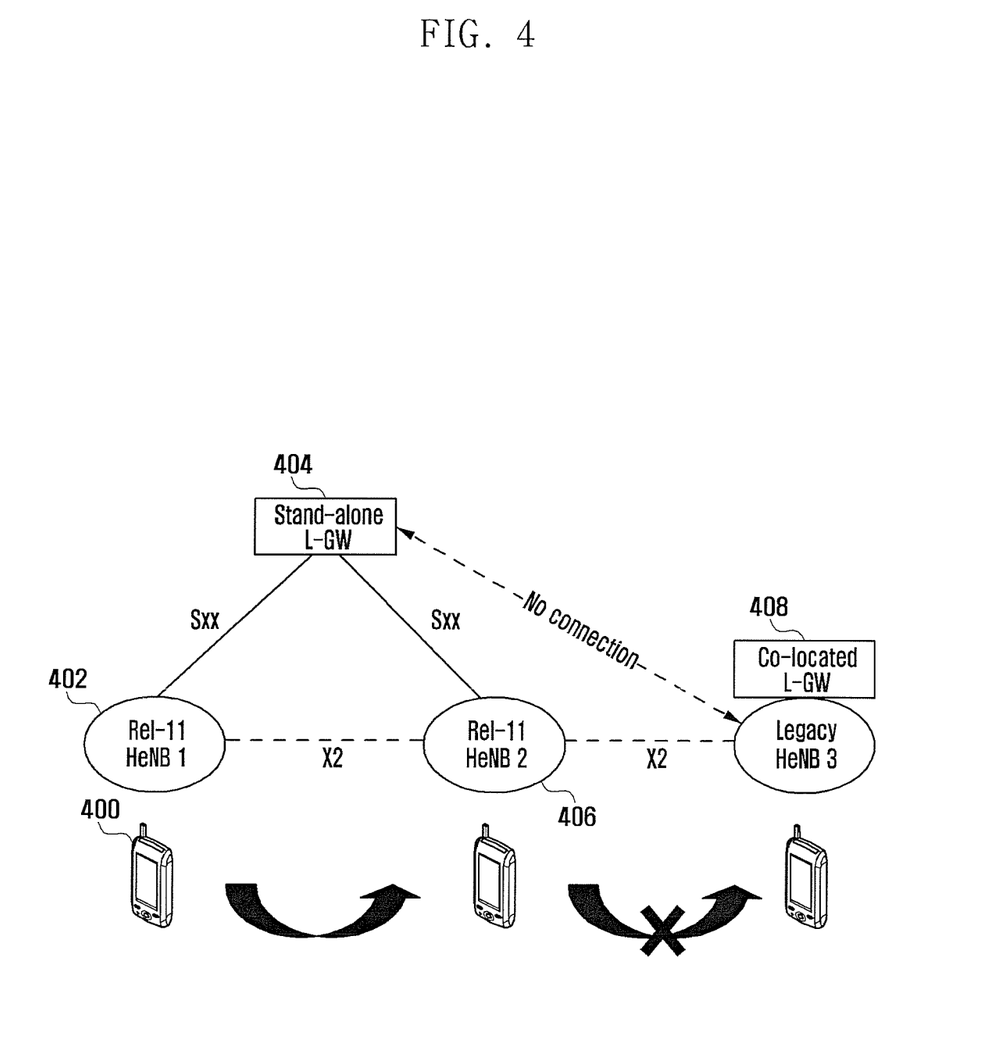
FIG. 4 is a diagram illustrating UE mobility in the network where the Rel-11 HeNB and PRE Rel-11 HeNB coexist.

FIG. 4 is a diagram illustrating UE mobility in the network where the Rel-11 HeNB and PRE Rel-11 HeNB coexist. In FIG. 4, it is assumed that the UE 400 has established an LIPA PDN connection to the stand-alone L-GW 404 through Rel-11 H(e)NB 402. If another H(e)NB 406 nearby the H(e)NB 402 is the Rel-11 H(e)NB, the UE may between the H(e)NBs 402 and 406 while maintaining the LIPA PDN connection. However, if the nearby H(e)NB is the PRE Rel-11 H(e)NB 408, the H(e)NB cannot establish a connection with the stand-alone L-GW 404. Therefore, the system cannot support mobility of the UE 400 between the two H(e)NBs 406 and 408 while maintaining the LIPA PDN connection.

DISCLOSURE OF INVENTION

Technical Problem

The present invention has been proposed to solve the above problem and aims to provide a method and apparatus for controlling mobility of the UE having LIPA PDN connection efficiently in a local network where the Rel-11 H(e)NB and PRE Rel-11 H(e)NB coexist.

Solution to Problem

In accordance with an aspect of the present invention, a method for managing Local IP Access (LIPA) of a User Equipment (UE) in connected state includes making, at a source home base station of the terminal, a handover decision for the UE, determining, when the handover decision for the UE is made, whether a target home base station is a Long Term Evolution (LTE) release 10 or earlier home base station (Pre Rel-11 HeNB), and releasing, when the target home base station is the Pre Rel-11 HeNB or a home base station belonging to different local network, the LIPA connection of the UE.

In accordance with another aspect of the present invention, a system for managing Local IP Access (LIPA) connection of a User Equipment (UE) in idle state includes the UE which transmits a Tracking Area Update (TAU) to a home base station to which the UE is connected, the home base station which transmits an LHN ID of the home base station along with the received TAU to a Mobility Management Entity (MME), and the MME which releases, when the LHN ID of the home base station is not received along with the TAU or when the received LHN ID differs from the LHN ID for the UE, LIPA connection of the UE which corresponds to the TAU.

Advantageous Effects of Invention

The mobility control method of the present invention is advantageous in controlling the mobility of the UE having the LIPA PDN connection efficiently in the local network where the Rel-11 H(e)NB and PRE Rel-11 H(e)NB coexist.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail.

Although the embodiments of the present invention are basically directed to the 3$^{rd}$ Generation Partnership (3GPP) LIMONET system, it will be understood by those skilled in the art that the present invention can be applied even to other communication systems having the similar technical background and channel format, with a slight modification, without departing from the spirit and scope of the present invention.

In the following descriptions on the embodiments of the present invention, the information exchanged for determining whether the H(e)NB supports mobility may be the address of the L-GW or LHN-ID. Both the two informations may be exchanged for use in determination on whether the H(e)NB supports mobility. Without departing from the structure set forth in the present invention, similar information can be used for determining whether the H(e)NB supports mobility, and this will be understood by those in the art of the present invention.

Figure 5:
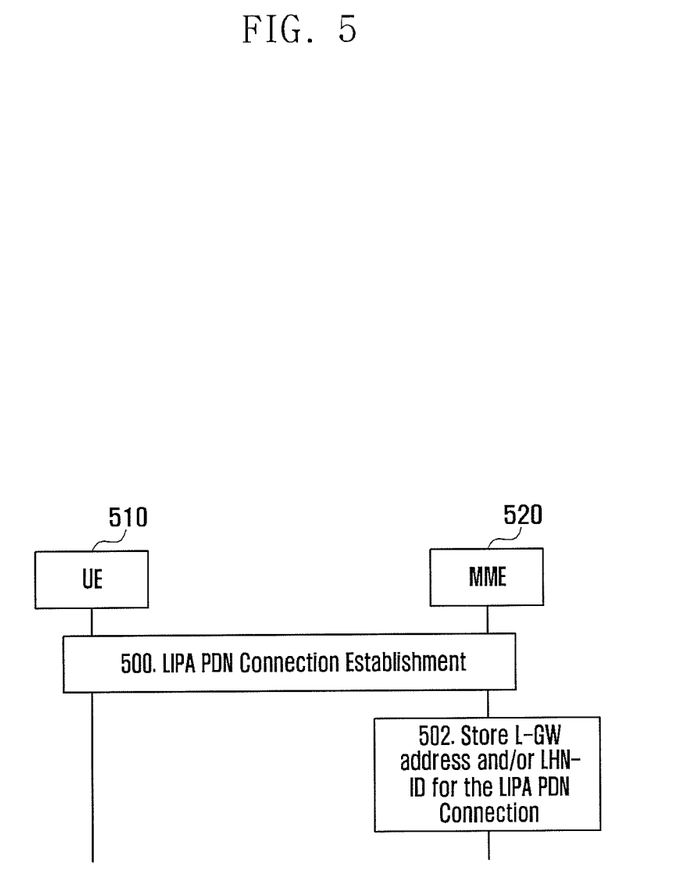
FIG. 5 is a signal flow diagram illustrating a PDN connection establishment procedure of the UE 510.

FIG. 5 is a signal flow diagram illustrating a PDN connection establishment 200 procedure of the UE 510. As shown in the drawing, the Mobility Management Entity 520 may store the information on the LIPA connection of the UE 510. Here, the information on the LIPA connection of the UE 510 may include the L-GW address for use in the corresponding LIPA PDN connection and ID of the local network to which the H(e)NB and L-GW has established the LIPA PDN connection, i.e. LHN-ID, at step 502.

Figure 6:
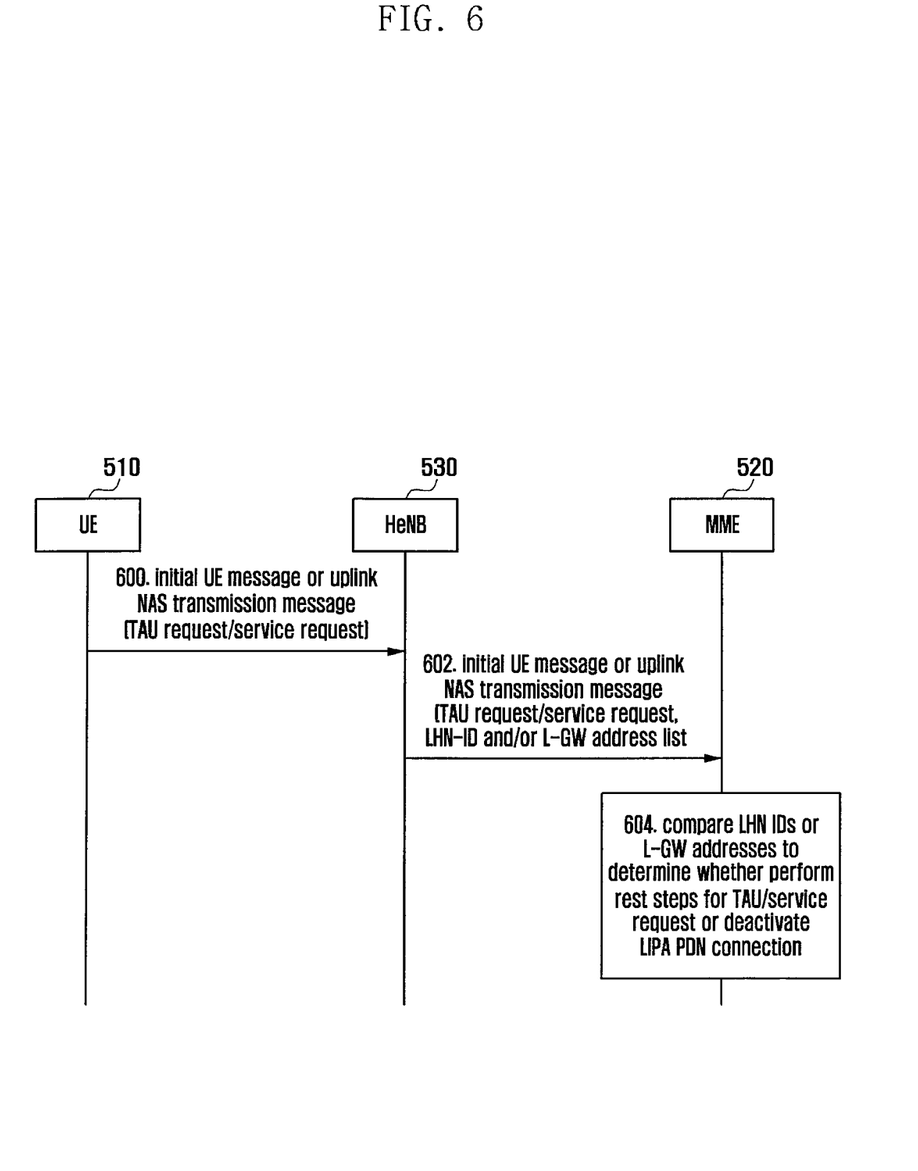
FIG. 6 is a signal flow diagram illustrating a mobility management procedure of the UE according to an embodiment of the present invention.

Suppose that the UE in idle mode moves between two H(e)NBs in the exemplary environment of FIG. 4. It is assumed that the UE established the LIPA PDN connection via the Rel-11 H(e)NB has move to the PRE Rel-11 H(e)NB in the idle state. In this case, the UE cannot use the LIPA PDN connection after the movement. Even when the UE established the LIPA PDN connection in the local network moves to another local network, it cannot maintain the LIPA PDN connection. FIG. 6 shows an embodiment of the present invention to solve this problem.

FIG. 6 is a signal flow diagram illustrating a mobility management procedure of the UE according to an embodiment of the present invention. It is assumed that the UE 510 has moved to the area of another H(e)NB before step 600. The UE 510 transmits a Tracking Area Update (TAU) or Service Request to the MME 520 in the area of the H(e)NB 530 at step 600. The H(e)NB 530 sends the MME 520 the TAU or service request message using the S1_AP initial UE message or uplink NAS transport message along with the address of the L-GW connected to it 530 and/or LHN-IDs of it 530 at step 602. This is for the case where one H(e)NB uses a plurality LHN IDs or connects to a plurality L-GWs. As described with reference to FIG. 5, the MME 520 has stored the information on the LIPA PDN connection, i.e. L-GW address or LHN-ID, of the UE 510 already. Accordingly, the MME 520 compares the information on the LIPA PDN connection of the UE 510 which has been stored already and the information on the LIPA PDN connection of the UE 510 which has been received newly to determine whether the UE has moved from the Rel-11 H(e)NB to the PRE Rel-11 H(e)NB or new local network at step 604. For example, if the previously stored L-GW address or LHN-ID mismatches the newly received ones, the MME 520 determines that the UE 510 has moved from the Rel-11 H(e)NB to the PRE Rel-11 H(e)NB. This is because the PRE Rel-11 H(e)NB transfers neither the L-GW address or LHN-ID and, although transferring one, it differs from the L-GW address or LHN-ID of the Rel-11 H(e)NB in the local network. In this case, the MME 520 deactivates the corresponding LIPA PDN connection. Otherwise if the previously stored L-GW address or LHN-ID matches the newly received value, the MME 520 determines that the UE 510 is connected to the Rel-11 H(e)NB constantly.

Another embodiment of the present invention proposes a method of solving the problem occurring when the UE in the connected mode moves between H(e)NBs. The embodiments to be described hereinafter relate to the methods handling the movement of the UE in the connected mode from the Rel-11 H(e)NB to the PRE Rel-11 H(e)NB and the method of handling the movement of the UE to a new local network. The source H(e)NB, i.e. Rel-11 H(e)NB checks the type of the target H(e)NB or the local network to which the H(e)NB belongs. If it is determined that the target H(e)NB is the PRE Rel-11 H(e)NB or H(e)NB belonging to another local network, the source H(e)NB may deactivate the LIPA PDN connection before handover. In order to deactivate the LIPA PDN connection before the handover, the source H(e)NB may request the L-GW for PDN connection deactivation or excludes the LIPA PDN connection bearer from the handover target bearers.

Figure 7:
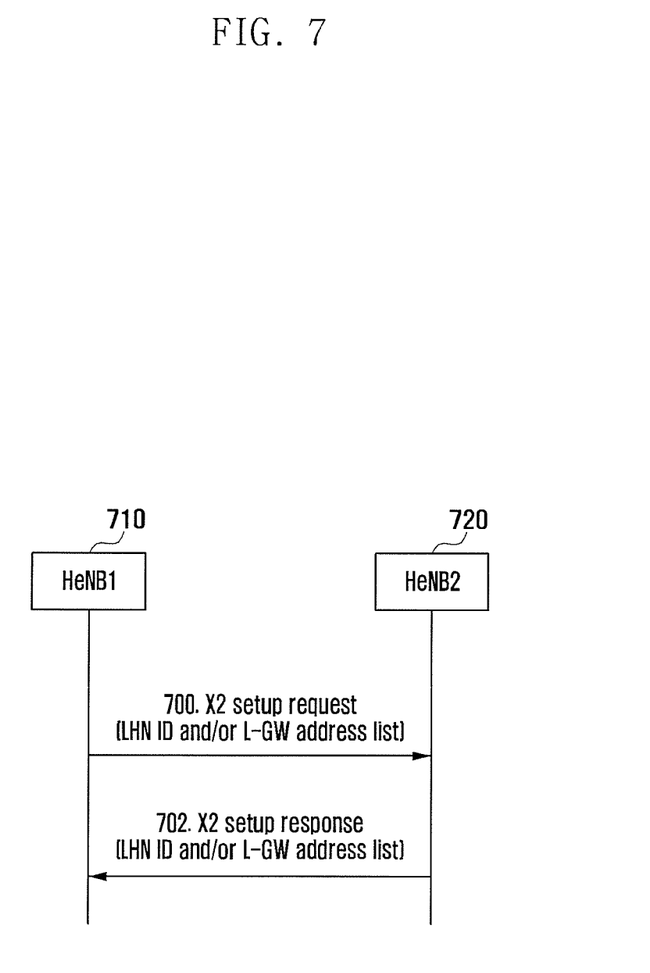
FIG. 7 is a signal flow diagram illustrating a LIPA mobility management procedure using X2 interface according to an embodiment of the present invention.

FIG. 7 is a signal flow diagram illustrating a LIPA mobility management procedure using X2 interface according to an embodiment of the present invention. As shown in FIG. 7, it is necessary to perform X2 setup process to use the X2 interface between two H(e)NBs 710 and 720. At step 700, the H(e)NB 1 710 transmits the addresses of the L-GWs connected thereto and/or LHN-IDs along with the X2 setup request message sent to the H(e)NB 2 720. This is for the case when one H(e)NB uses a plurality of LHN IDs or connects to a plurality of L-GWs. At step 702, the H(e)NB 2 720 sends the H(e)NB 1 710 an X2 setup response message including the addresses of the L-GWs connected to itself and/or LHN-IDs in response to the X2 setup request. Such a function is not implemented in the PRE Rel-11 H(e)NB. Accordingly, if the response including the addresses of the L-GWs connected to it and/or LHN-IDs is not received from the H(e)NB 2 720, the H(e)NB 1 710 may determine that the H(e)NB 2 720 is the PRE Rel-11 H(e)NB. Through this procedure, the Rel-11 H(e)NB is capable of checking whether the counterpart H(e)NB is the Rel-11 H(e)NB and which L-GW the counterpart H(e)NB is connected, and which LHN the counterpart H(e)NB belongs to.

Figure 8:
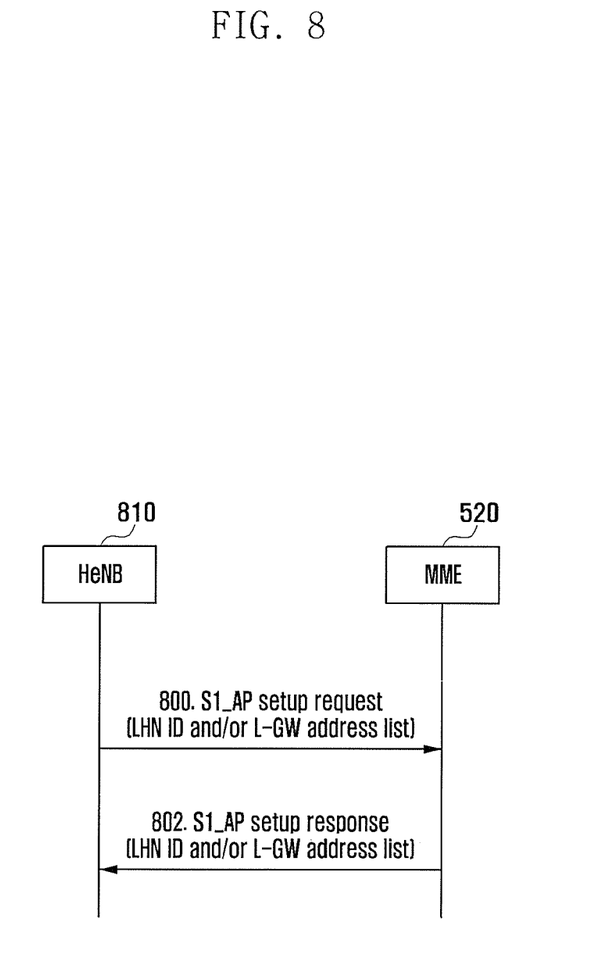
FIG. 8 is a signal flow diagram illustrating a LIPA mobility management procedure using S1-AP interface according to an embodiment of the present invention.

FIG. 8 is a signal flow diagram illustrating a LIPA mobility management procedure using S1-AP interface according to an embodiment of the present invention. As shown in FIG. 8, in order for the H(e)NB 810 to connect to the core network of the operator network and be under the control thereof, it is necessary to establish the S1-AP interface between the MME 520 and the H(e)NB 810. The H(e)NB 810 sends the MME 520 an S1-AP setup request message including the addresses of the L-GWs to which it has connected and/or LHN-IDs at step 800. This is for case where an H(e)NB uses a plurality of LHN IDs or connects to a plurality of LGWs. The MME 520 sends the H(e)NB 810 an S1-AP setup response message including the information on other H(e)NBs present in the local network to which the corresponding H(e)NB 810 belongs, i.e. the addresses of the connected L-GWs and/or LHN-IDs, at step 802. The H(e)NB is capable of checking whether the other H(e)NB is the Rel-11 H(e)NB, which L-GW the other H(e)NB is connected, and which LHN the other H(e)NB belongs to.

Figure 9:
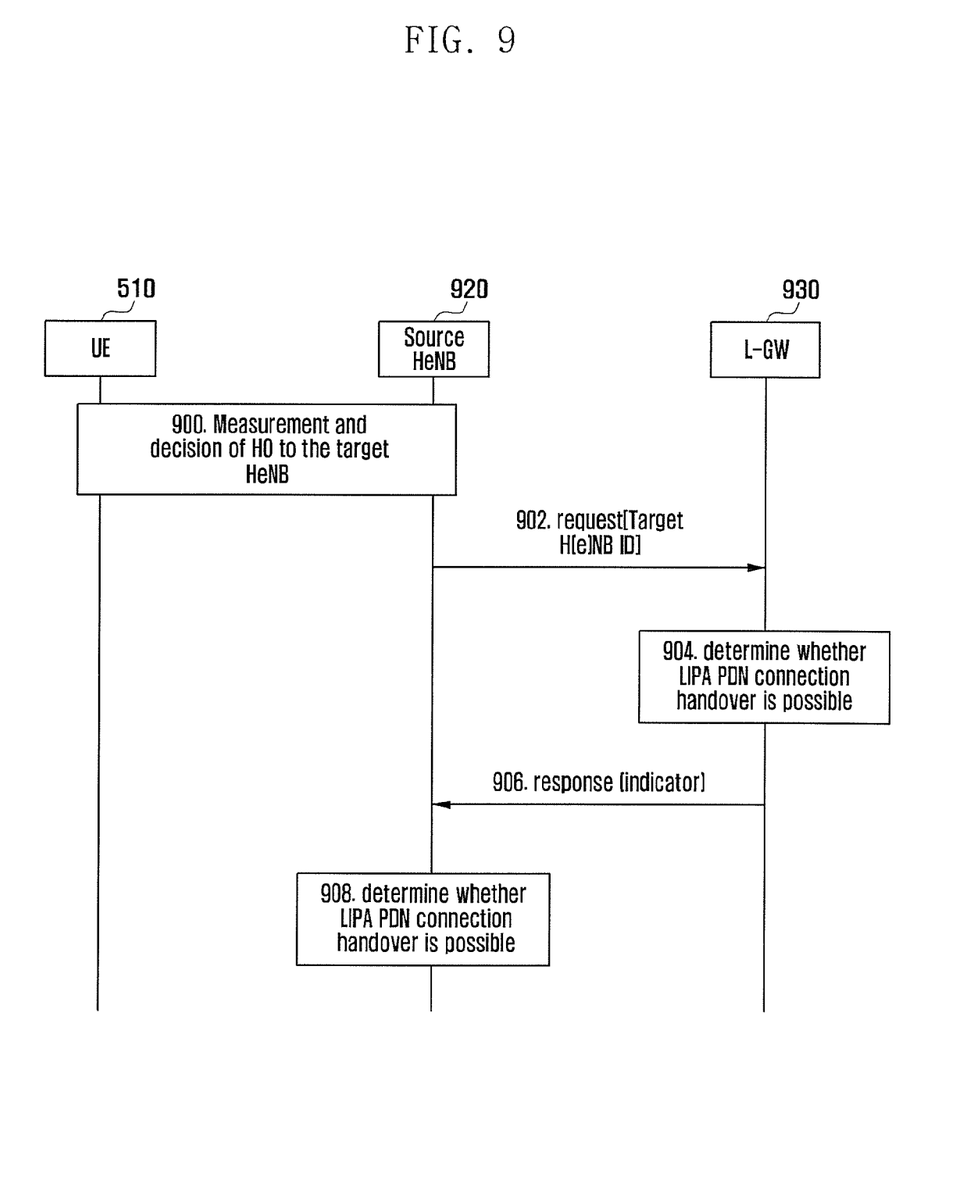
FIG. 9 is a signal flow diagram illustrating a mobility management procedure of the UE using Sxx interface according to an embodiment of the present invention.

FIG. 9 is a signal flow diagram illustrating a mobility management procedure of the UE using Sxx interface according to an embodiment of the present invention. The UE 510 and the source HeNB 920 (Rel-11 H(e)NB) make a handover decision according to the channel state measurement at step 900. The source HeNB 920 may inquire of the L-GW 930 whether the target HeNB is the Rel-11 H(e)NB at step 902. That is, the source H(e)NB 920 transmits the message requesting for the information on whether the target HeNB is connected to the L-GW 930 to which it has connected. At step 904, the L-GW 930 determines whether the target H(e)NB is connected thereto. The L-GW 930 replies with the indication on whether the target H(e)NB is connected thereto at step 906. It should be noted that the Pre Rel-11 H(e)NB cannot connect to the stand-alone L-GW. At step 908, the source H(e)NB 920 may determine whether to perform LIPA PDN-connected handover using the indication of step 906.

Figure 10:
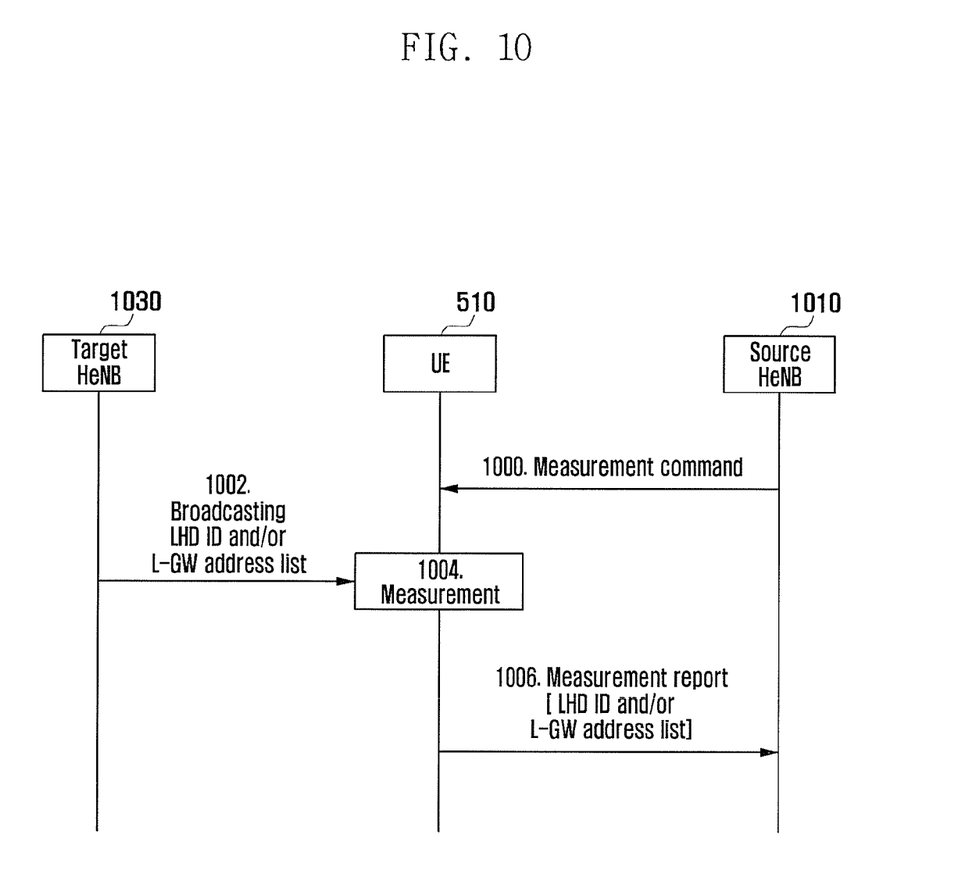
FIG. 10 is a signal flowchart illustrating a mobility management procedure of the UE using the measurement command according to an embodiment of the present invention.

FIG. 10 is a signal flowchart illustrating a mobility management procedure of the UE using the measurement command according to an embodiment of the present invention. It is assumed that the source H(e)NB 1010 has made a handover decision for the UE 510 before step 1000. However, the source H(e)NB 1010 does not know yet whether the target H(e)NB 1030 is a Pre Rel-11 H(e)NB or a Rel-11 H(e)NB. At step 1000, the source HeNB 1010 sends the UE 510 the command to measure the cell of the target H(e)NB 1030 and report the measurement result. The target HeNB 1030 (Rel-11 H(e)NB) broadcasts the addresses of the L-GWs to which it has connected and/or its LHN-IDs periodically at step 1002. The UE 510 receives the broadcast information at step 1004. The UE 510 sends the source H(e)NB 1010 the received L-GW address and/or LHN-IDs at step 1006. The source H(e)NB 1010 determines whether the target H(e)NB 1030 is the Pre Rel-11 H(e)NB based on the received information. Accordingly, if the L-GW address and/or LHN-ID is not received at step 1006 or if a message notifying the UE 510 of no receipt of the L-GW address and/or LHN-ID is received, the source H(e)NB 1010 may determine that the target HeNB 1030 is the Pre Rel-11 H(e)NB.

Figure 11:
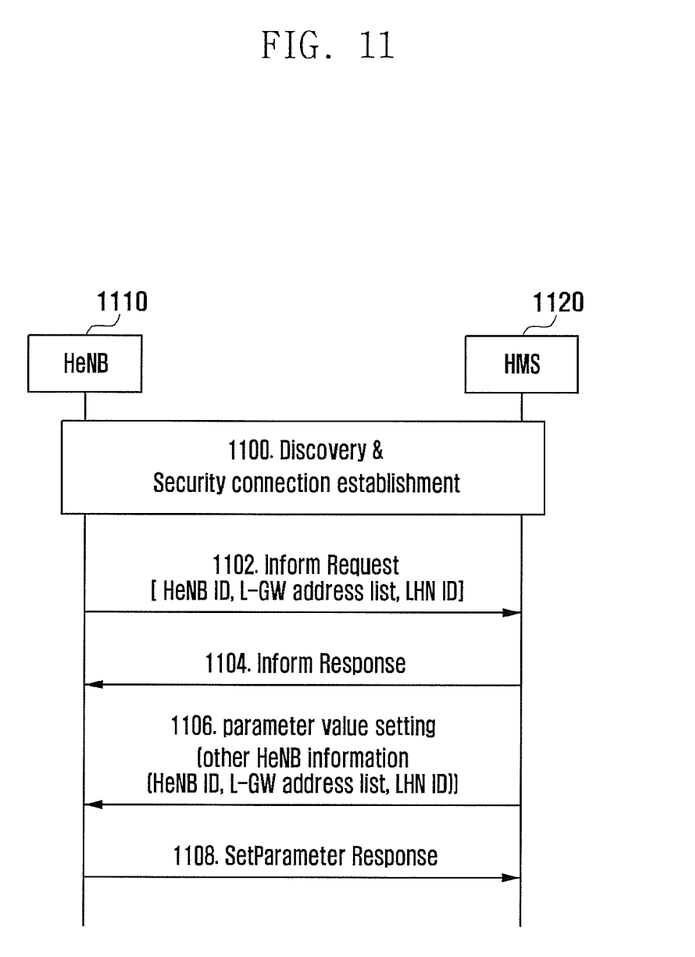
FIGS. 11 and 12 are signal flow diagrams illustrating mobility management procedures of the UE using an H(e)NB Management System (HMS) according to an embodiment of the present invention.
Figure 12:
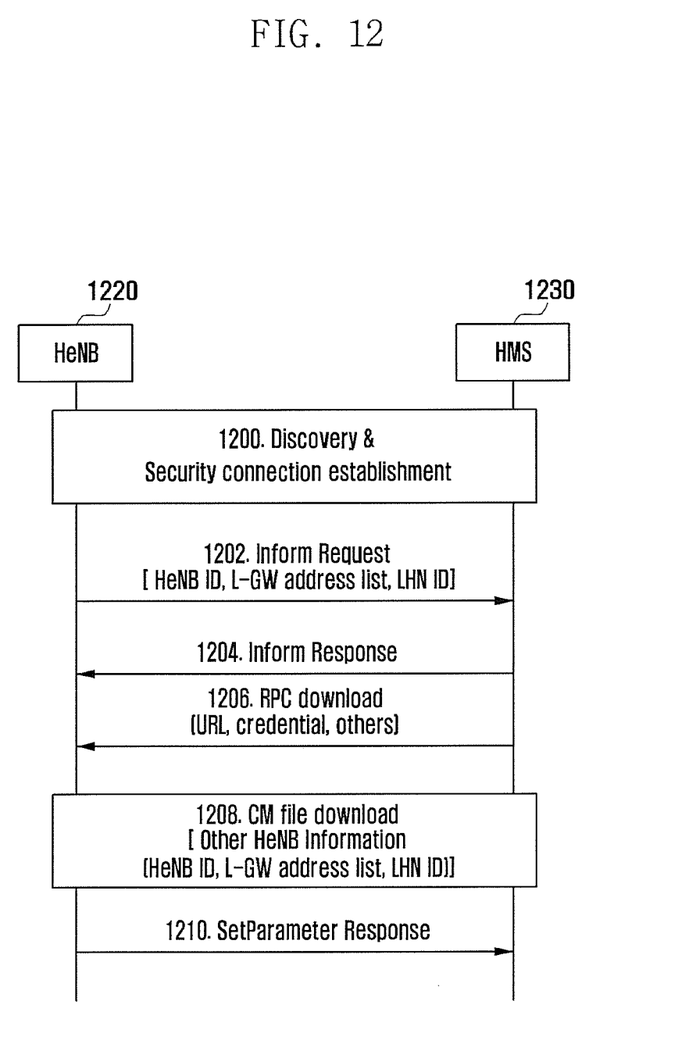

FIGS. 11 and 12 are signal flow diagrams illustrating mobility management procedures of the UE using an H(e) NB Management System (HMS) according to an embodiment of the present invention. The HMS is the function for configuring H(e)NBs that may be installed by the operation in the location network.

As shown in FIG. 11, if the H(e)NB 1110 powers on first, it may discover the HMS 1120 and establish a security connection therewith at step 1100. The H(e)NB 1110 sends the HMS 1120 an information request with the addresses of the L-GWs connected thereto and/or LHN IDs at step 1102. The HMS 1120 stores the received information. The HMS 1120 sends the H(e)NB 1110 an information response message at step 1104. The HMS 1120 transmits a parameter value setting (SetParameterValues) message including the information on the other H(e)NBs present in the local network to which the corresponding H(e)NB 110 belongs, i.e. the addresses of the L-GWs to which the other H(e)NB has connected and/or the LHN-IDs, at step 1106. The H(e)NB 1110 sends the HMS 1120 a parameter setting response message.

As shown in FIG. 12, the HMS 1230 may send the HeNB 1220 only the information on the setting information file instead of including the actual information in the response message selectively. Afterward, the H(e)NB 1220 may download the corresponding file to acquire the information. If the H(e)NB 1220 powers on first after installation, it may discover the HMS 1230 and establish a security connection therewith at step 1200. The H(e)NB 1220 sends the HMS 1230 the information request with the addresses of the L-GWs connected thereto and/or LHN IDs at step 1202. The HMS 1230 sends the H(e)NB 1220 the information response message at step 1204. The HMS 1230 sends the H(e)NB 1220 the information of the setting information file (e.g. URL of file and credential) at step 1206. At step 1208, the H(e)NB 1120 downloads the addresses of the L-GWs to which other H(e)NB is connected and/or LHN-IDs from the HMS 1230 using the URL of the setting information file of step 1206. The H(e)NB 1220 sends the HMS 1230 the parameter setting response at step 1210.

The invention claimed is:

1. A method for managing local packet data network (PDN) connection of a terminal by a mobility management entity (MME), the method comprising:
    establishing the local PDN connection for the terminal;
    receiving a message including a local home network identifier (LHN ID) from a base station to which the terminal is connected;
    determining whether the LHN ID is changed; and
    deactivating the local PDN connection of the terminal if the LHN ID is changed.

2. The method of claim 1, further comprises storing the LHN ID, wherein the LHN ID is associated with the local PDN connection for the terminal.

3. The method of claim 2, wherein the determining further comprises determining the LHN ID is changed if the LHN ID included in the message is different from the stored LHN ID.

4. The method of claim 1, wherein the message includes a tracking area update (TAU) request transmitted from the terminal to the MME via the base station, and wherein the deactivating further comprises deactivating the PDN connection corresponding to the terminal which transmits the TAU request.

5. The method of claim 1, wherein the message corresponds to a S1_AP Initial UE message or an uplink non access stratum (NAS) transport message.

6. A method for managing local packet data network (PDN) connection of a terminal by a base station that the terminal is connected, the method comprising:
receiving a first message including a tracking area update (TAU) request from the terminal;
generating a second message including a local home network identifier (LHN ID) and the TAU request; and
transmitting the second message to a mobility management entity (MME) that establishes the local PDN connection for the terminal,
wherein if the LHN ID is changed, the local PDN connection of the terminal is deactivated.

7. The method of claim 6, wherein the LHN ID is stored in the MME if the MME establishes the PDN connection with the terminal, and the local PDN connection of the terminal is deactivated by the MME if the LHN ID included the second message is different from the stored LHN ID.

8. The method of claim 6, wherein the second message corresponds to a S1_AP initial UE message or an uplink non access stratum (NAS) transport message.

9. A mobility management entity (MME) for managing local packet data network (PDN) connection of a terminal, the MME comprising:
a transceiver configured to transmit and receive a signal; and
a controller configured to:
establish the local PDN connection for the terminal,
control the transceiver to receive a message including a local home network identifier (LHN ID) from a base station to which the terminal is connected,
determine whether the LHN ID is changed, and
deactivate the local PDN connection of the terminal if the LHN ID is changed.

10. The MME of claim 9, further comprises a storage configured to store the LHN ID, wherein the LHN ID is associated with the local PDN connection for the terminal.

11. The MME of claim 10, wherein the controller is further configured to determine the LHN ID is changed if the LHN ID included in the message is different from the stored LHN ID.

12. The MME of claim 10, wherein the message includes a tracking area update (TAU) request transmitted from the terminal to the MME via the base station, and
wherein the controller is further configured to deactivate the PDN connection corresponding to the terminal that transmits the TAU request.

13. The MME of claim 10, wherein the message corresponds to a S1_AP Initial UE message or an uplink non access stratum (NAS) transport message.

14. A base station, to which a terminal is connected, configured to manage local IP access (LIPA) of the terminal the base station comprising:
a transceiver configured to transmit and receive a signal; and
a controller configured to:
control the transceiver to receive a first message including a tracking area update(TAU) request from the terminal, generate a second message including a local home network identifier (LHN ID) and the TAU request, and control the transceiver to transmit the second message to a mobility management entity (MME) that establishes a local packet data network (PDN) connection for the terminal,
wherein if the LHN ID is changed, the local PDN connection of the terminal is deactivated.

15. The base station of claim 14, wherein the LHN ID is stored in the MME if the MME establishes the PDN connection with the terminal, and the local PDN connection of the terminal is deactivated by the MME if the LHN ID included the second message is different from the stored LHN ID.

16. The base station of claim 14, wherein the second message corresponds to a S1_AP initial UE message or an uplink non access stratum (NAS) transport message.

* * * * *